(12) United States Patent
Miura

(10) Patent No.: US 9,863,435 B2
(45) Date of Patent: Jan. 9, 2018

(54) FAN UNIT INCLUDING VIBRATION SUPPRESSING STRUCTURE AND ELECTRIC MOTOR

(71) Applicant: FANUC CORPORATION, Yamanashi (JP)

(72) Inventor: Masaki Miura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 10 days.

(21) Appl. No.: 14/563,154

(22) Filed: Dec. 8, 2014

(65) Prior Publication Data

US 2015/0159675 A1 Jun. 11, 2015

(30) Foreign Application Priority Data

Dec. 11, 2013 (JP) ................................. 2013-255946

(51) Int. Cl.
| | |
|---|---|
| F04D 29/42 | (2006.01) |
| F04D 13/06 | (2006.01) |
| F04D 29/66 | (2006.01) |
| F04D 29/62 | (2006.01) |
| H02K 5/24 | (2006.01) |
| H02K 9/04 | (2006.01) |

(52) U.S. Cl.
CPC ......... *F04D 29/4226* (2013.01); *F04D 13/06* (2013.01); *F04D 29/626* (2013.01); *F04D 29/667* (2013.01); *F04D 29/668* (2013.01); *H02K 5/24* (2013.01); *H02K 9/04* (2013.01)

(58) Field of Classification Search
None
See application file for complete search history.

(56) References Cited

U.S. PATENT DOCUMENTS

| | | | | |
|---|---|---|---|---|
| 5,788,566 A | * | 8/1998 | McAnally | H05K 7/20172 361/695 |
| 2003/0039546 A1 | * | 2/2003 | Liu | F04D 29/626 415/213.1 |
| 2005/0271506 A1 | | 12/2005 | Pan | |
| 2007/0089897 A1 | * | 4/2007 | Zimmer | F24F 13/082 3/82 |

FOREIGN PATENT DOCUMENTS

| | | | | |
|---|---|---|---|---|
| CN | 202360464 U | | 8/2012 | |
| DE | 102010036831 A1 | | 5/2011 | |
| EP | 0610757 | | 8/1994 | |
| GB | 659585 A | * | 10/1951 | H02K 5/20 |

(Continued)

OTHER PUBLICATIONS

English Translation of Japanese Publication No. 2004282991, published Oct. 7, 2004, 22 pages.

(Continued)

*Primary Examiner* — Charles Freay
*Assistant Examiner* — Kenneth J Hansen
(74) *Attorney, Agent, or Firm* — Fredrikson & Byron, P.A.

(57) ABSTRACT

A fan unit (2) includes a fan housing (3), a fan motor (5) provided in the fan housing, and a partition plate (4) that is attached to a partition plate attachment surface (6a) of the fan housing and that regulates air flow from the fan motor. A protrusion portion (7) is provided on the partition plate attachment surface of the fan housing.

4 Claims, 4 Drawing Sheets

(56) References Cited

FOREIGN PATENT DOCUMENTS

| | | | |
|---|---|---|---|
| JP | 5168188 | A | 7/1993 |
| JP | 9196401 | A | 7/1997 |
| JP | 1169702 | A | 3/1999 |
| JP | H11075340 | A | 3/1999 |
| JP | H11315799 | A | 11/1999 |
| JP | 2004282991 | A | 10/2004 |

OTHER PUBLICATIONS

English Translation of Japanese Publication No. H11315799, published Nov. 16, 1999, 15 pages.
English Translation of Japanese Publication No. H11075340, published Mar. 16, 1999, 21 pages.
English Machine Translation for Japanese Publication No. 5-168188 published Jul. 2, 1993, 6 pgs.
English Machine Translation for Japanese Publication No. 9-196401 published Jul. 31, 1997, 9 pgs.
English Machine Translation for Japanese Publication No. 11-69702 published Mar. 9, 1999, 11 pgs.
English Abstract and Machine Translation for German Publication No. 102010036831 A1, published May 12, 2011, 9 pgs.
English Abstract for European Publication No. 0610757 A2, published Aug. 17, 1994, 1 pg.
English Abstract and Machine Translation for Chinese Publication No. 202360464 U, published Aug. 1, 2012, 4 pgs.

* cited by examiner

FAN UNIT INCLUDING VIBRATION SUPPRESSING STRUCTURE AND ELECTRIC MOTOR

BACKGROUND OF THE INVENTION

1. Field of the Invention

The present invention relates to a fan unit provided in an electric motor.

2. Description of the Related Art

In order to stably operate an electric motor, a fan unit that supplies air flow to cool the electric motor is provided in the electric motor. A fan motor includes a propeller fan or a radial fan. When the fan motor includes a radial fan, a partition plate that regulates air flow from the radial fan is necessary.

However, when an electric motor and a fan motor are operated, vibration from the electric motor or the like may cause the fan motor to vibrate, and cause a noise to be generated in some cases. For this reason, according to Japanese Laid-open Patent Publication No. 5-168188, Japanese Laid-open Patent Publication No. 9-196401, and Japanese Laid-open Patent Publication No. 11-69702, a vibration-proof rubber is adopted to prevent vibration and a noise.

However, since vibration-proof rubber needs to be added according to Japanese Laid-open Patent Publication No. 5-168188, Japanese Laid-open Patent Publication No. 9-196401, and Japanese Laid-open Patent Publication No. 11-69702, the number of components of the fan unit increases, and it is troublesome to maintain and manage the components. Further, when a vibration-proof rubber is worn out by use, vibration and the like are generated again, and therefore vibration-proof rubber needs to be replaced.

In view of the above circumstances, the present invention has been completed and the objective thereof is to provide a fan unit that can prevent vibration and noise without vibration-proof rubber.

SUMMARY OF THE INVENTION

In order to accomplish the above-described objective, according to a first aspect, there is provided a fan unit including a fan housing, a fan motor provided in the fan housing, and a partition plate that is attached to a partition plate attachment surface of the fan housing and that regulates air flow from the fan motor, wherein a protrusion portion is provided on the partition plate attachment surface of the fan housing.

According to a second aspect, in the first aspect, a distal end of the protrusion portion contacting with the partition plate is a flat surface.

According to a third aspect, in the first or second aspect, a plurality of the protrusion portions are provided.

According to a fourth aspect, in the third aspect, a plurality of fixing portions that fix the partition plate are provided on the partition plate attachment surface, and a distance between one protrusion portion out of a plurality of the protrusion portions and one fixing portion closest to the one protrusion portion is equal to a distance between a different protrusion portion out of a plurality of the protrusion portions and a different fixing portion closest to the different protrusion portion.

According to a fifth aspect, there is provided an electric motor including a fan unit according to any one of the first to fourth aspects.

These objectives, features, and advantages, as well as additional objectives, features, and advantages of the present invention will become more apparent from detailed description of exemplary embodiments of the present invention illustrated in the accompanying drawings.

DETAILED DESCRIPTION

Hereinafter, an embodiment of the present invention is described with reference to the accompanying drawings. In the following drawings, the same reference symbols are used to the same members. To make it easier to understand, reduced scales of these drawings have been appropriately changed.

Figure 1:
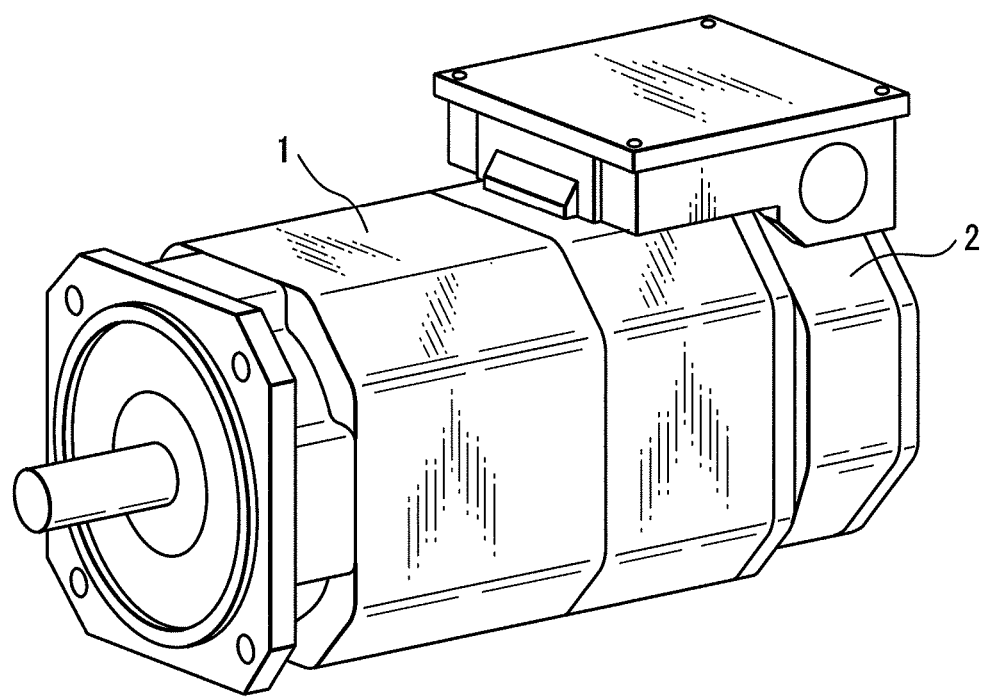
FIG. 1 is a perspective view of an electric motor to which a fan unit is provided according to the present invention.

FIG. 1 is a perspective view of an electric motor to which a fan unit is provided according to the present invention. An electric motor 1 illustrated in FIG. 1 is a motor that drives a main shaft and a feed shaft of a machine tool, or each shaft of a robot, for example. As illustrated in FIG. 1, a fan unit 2 is provided in a back surface of the electric motor 1. The fan unit 2 is used to perform an action such as air blow to the electric motor 1 and discharge of heat generated by the electric motor 1 to stably operate the electric motor 1.

Figure 2:
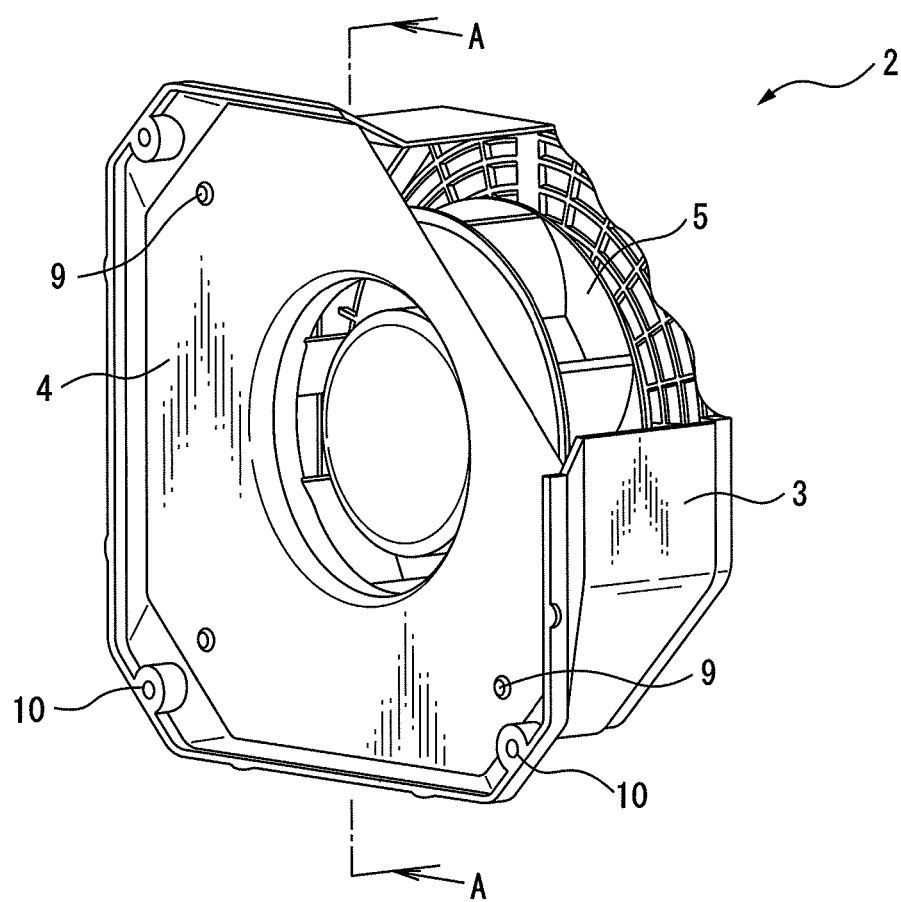
FIG. 2 is a perspective view of a partial section of the fan unit according to the present invention.

FIG. 2 is a perspective view of a partial section of the fan unit according to the present invention. As illustrated in FIG. 2, the fan unit 2 mainly includes a fan housing 3, and a radial-type fan motor 5 arranged in the fan housing 3. At an opening portion of the fan housing 3, a partition plate 4 having a shape corresponding to the opening portion is provided.

FIG. 2 illustrates that the partition plate 4 is provided so as to be concentric with the fan motor 5. The partition plate 4 plays a role of passing, through a through hole of the partition plate 4, air flow sent from the fan motor 5 to regulate the air flow. The partition plate 4 is arranged between the fan motor 5 and the electric motor 1 (not illustrated in FIG. 2), so that the air flow sent from the fan motor 5 passes through the partition plate 4 to be supplied to the electric motor 1, or to discharge heat generated by the electric motor 1, to cool the electric motor 1.

Figure 3:
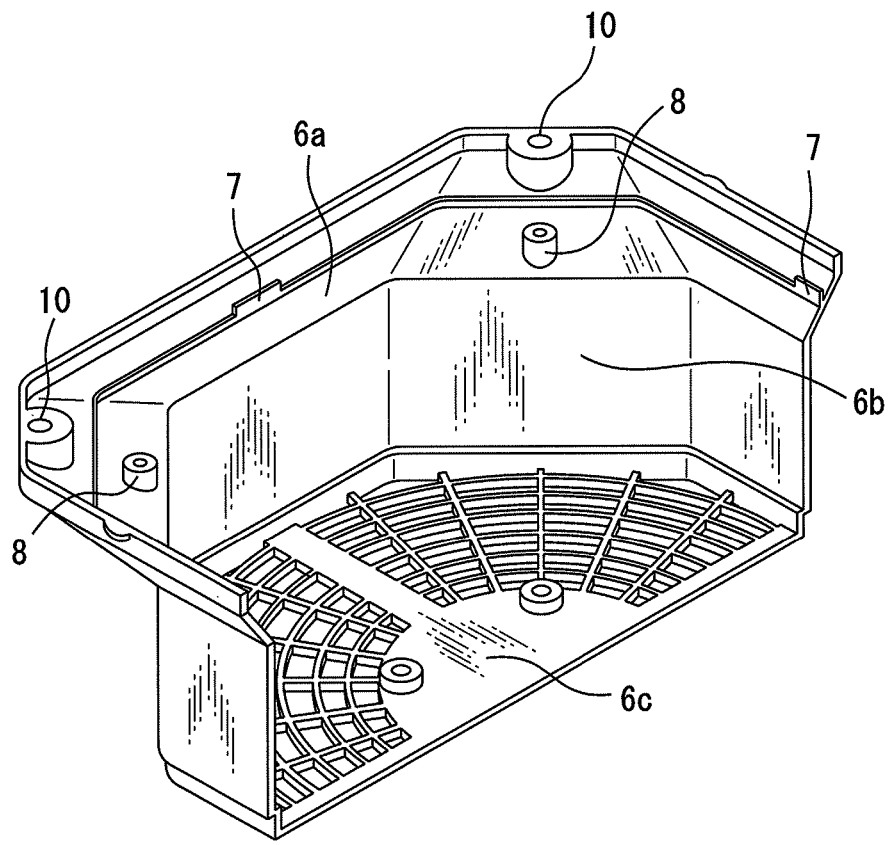
FIG. 3 is a perspective view of a partial section when seen along a line A-A in FIG. 2, in a state where a partition plate and a fan motor are removed.

FIG. 3 is a perspective view of a partial section when seen along a line A-A in FIG. 2, in a state where the partition plate and the fan motor are removed. As illustrated in FIG. 3, the fan housing 3 includes a partition plate attachment surface 6a extending from an outer edge thereof toward the radial inside, an inner circumferential surface 6b extending from an inner edge of the partition plate attachment surface 6a in the axial direction, and a bottom surface 6c connected to the inner circumferential surface 6b and closing the fan motor 5. In the bottom surface 6c, a plurality of holes are regularly formed. In the embodiment illustrated in the drawings, the inner circumferential surface 6b of the fan housing 3 has an approximately octagonal shape. However, the inner circumferential surface 6b may have another shape, such as, a circular shape, a rectangular shape, or a hexagonal shape.

In FIG. 3, screw holes 8 are formed at corner portions of the partition plate attachment surface 6a of the fan housing 3. As seen by comparing FIG. 2 with FIG. 3, a plurality of, for example, four screws 9 are made to pass through corner portions of the partition plate 4 to threadedly engage with the screw holes 8, respectively. Thereby, the partition plate 4 is attached to the opening portion of the fan housing 3. In FIG. 3, other screw holes 10 located at positions more outer than positions of the screw holes 8 are illustrated. The screw holes 10 are used for fixing the fan unit 2 to the back surface of the electric motor 1 (refer to FIG. 1).

As illustrated in FIG. 3, protrusion portions 7 that protrude from the partition plate attachment surface 6a of the fan housing 3 are provided on the partition plate attachment surface 6a. Each of the protrusion portions 7 is formed at an approximately center of one side of the opening portion of the fan housing 3. The fan housing 3 includes four protrusion portions 7 on the partition plate attachment surface 6a. It is preferable that the protrusion portions 7 are arranged so as to be bilaterally symmetric with respect to a diameter of the fan housing 3 or rotationally symmetric with respect to a center line of the fan housing 3.

Figure 4:
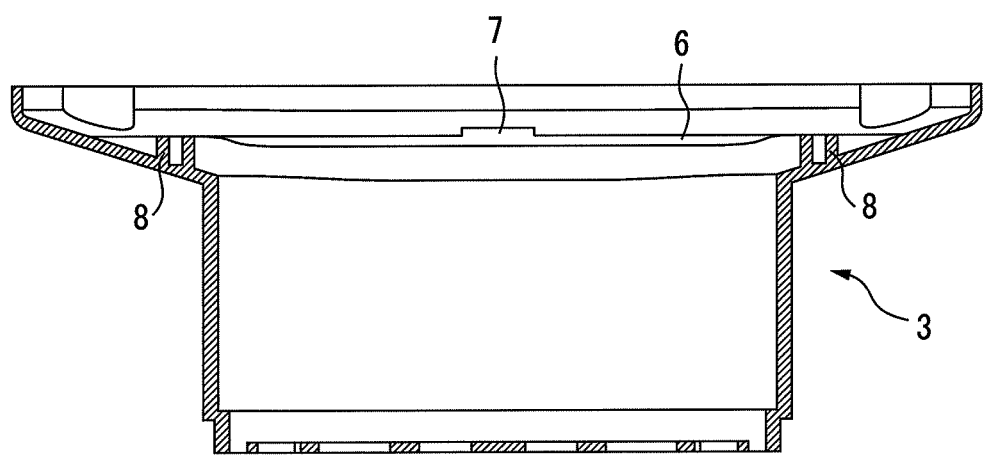
FIG. 4 is a sectional view of a fan housing of the fan unit according to one embodiment of the present invention.
Figure 6:
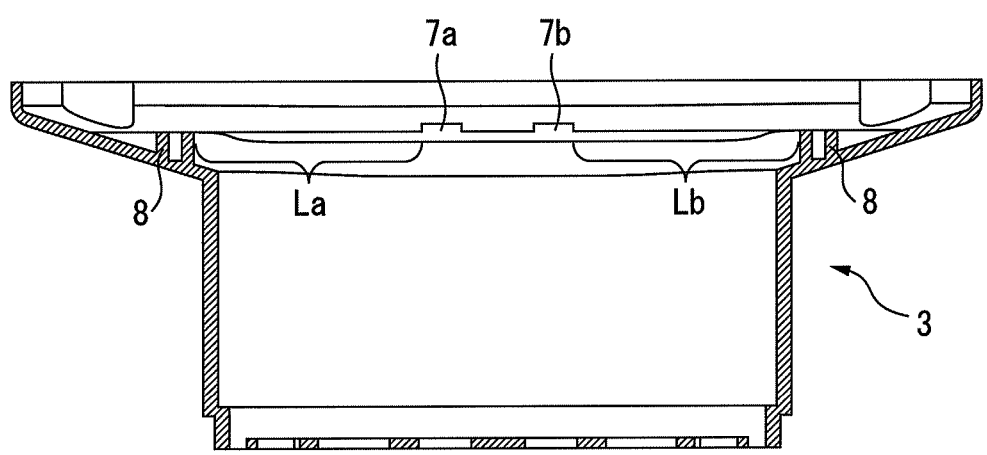
FIG. 6 is a sectional view of a fan housing of a fan unit according to another embodiment of the present invention.

FIG. 4 is a sectional view of the fan housing of the fan unit according to the one embodiment of the present invention. In FIG. 4 and FIG. 6 described below, illustration of the partition plate 4 and the fan motor 5 is omitted for the purpose of making it easier to understand. Referring to FIGS. 3 and 4, the protrusion portion 7 is an elongated protrusion extending parallel with the outer edge of the fan housing 3. It is preferable that the protrusion portion 7 has a relatively small height and a relatively large width. Moreover, for the purpose of easy fabrication, it is also preferable that a depth of the protrusion portion 7 is relatively small.

Figure 5:
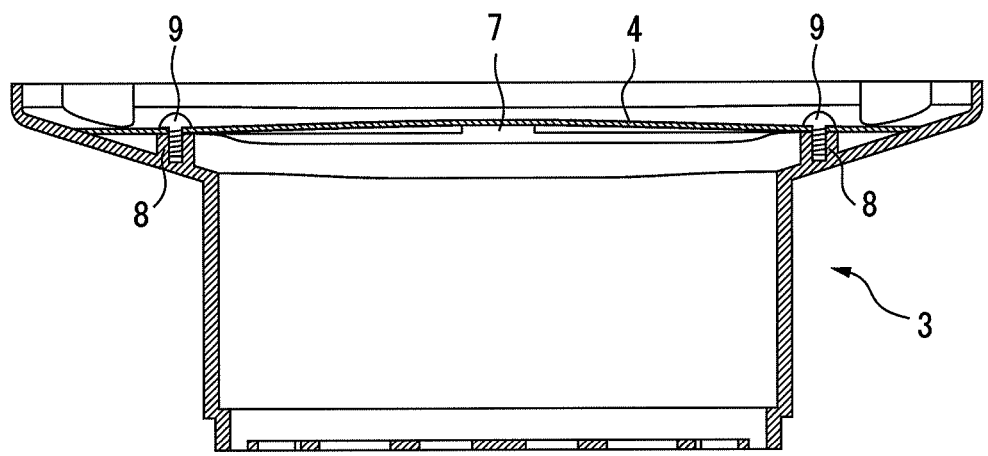
FIG. 5 is a sectional view of the fan housing of FIG. 4 in a state where the partition plate is attached.

FIG. 5 is a sectional view of the fan housing of FIG. 4 in a state where the partition plate is attached. As illustrated in FIG. 5, the screws 9 fix the partition plate 4 to the screw holes 8 of the fan housing 3. The protrusion portion 7 protrudes from the partition plate attachment surface 6a so that a distal end of the protrusion portion 7 is located at a position higher than the partition plate attachment surface 6a. For this reason, when the screws 9 are made to threadedly engage with the screw holes 8 to attach the partition plate 4 to the partition plate attachment surface 6a, the partition plate 4 is pressed against the protrusion portion 7. Accordingly, the partition plate 4 is convexly warped upward in the vicinity of the center of the side portion of the partition plate 4.

In other words, the partition plate 4 is forcibly pressed against the partition plate attachment surface 6a of the fan housing 3. For this reason, the partition plate 4 and the fan housing 3 are substantially integrated, which can suppress vibration and a noise between the partition plate 4 and the fan housing 3. Therefore, in the present invention, a vibration-proof rubber adopted in the prior art can be removed. As a result, cost can be reduced, the fan unit 2 can be easily manufactured, and manufacturing time can be decreased.

Further, as described above, the protrusion portion 7 is an elongated protrusion extending in parallel with the outer edge of the fan housing 3. The distal end of the protrusion portion 7 is configured as a flat surface. Accordingly, when the partition plate 4 is attached, the distal end of the protrusion portion 7 is brought into a surface contact with the partition plate 4. For this reason, it will be clarified that in the present invention, vibration and a noise can be suppressed more than compared with a case where the distal end of the protrusion portion 7 has a point contact with the partition plate 4.

Furthermore, FIG. 6 is a sectional view of a fan housing of a fan unit according to another embodiment of the present invention. In FIG. 6, two protrusion portions 7a and 7b are formed side by side at the center of one side of an opening portion of the fan housing 3. In other words, in the embodiment illustrated in FIG. 6, two protrusion portions 7a and 7b are arranged on each of four sides of the opening portion of the fan housing 3. It is preferable that pairs of the protrusion portions 7a and 7b are arranged so as to be bilaterally symmetric with respect to a diameter of the fan housing 3 or rotationally symmetric with respect to a center line of the fan housing 3.

In FIG. 6, a distance La between one protrusion portion 7a and the left-side screw hole 8 neighboring the one protrusion portion 7a is equal to a distance Lb between the other protrusion portion 7b and the right-side screw hole 8 neighboring the other protrusion portion 7b. This is applied to the other sides, as well, even though not illustrated in the drawings.

When a plurality of protrusion portions 7a and 7b are provided on one side of the opening portion of the fan housing 3, each of the plurality of protrusion portions 7a and 7b is pressed against the partition plate. Accordingly, it will be clarified that vibration and noise can be more suppressed compared with a case of providing a single protrusion portion 7 (FIG. 4).

Further, in the embodiment illustrated in FIG. 6, positions of the two protrusion portions 7a and 7b are bilaterally symmetric in the direction of one side of the opening portion of the fan housing 3. In other words, the two protrusion portions 7a and 7b maintain the balance in right and left so that vibration and noise can be more suppressed.

EFFECTS OF THE INVENTION

According to the first aspect, since the protrusion portion is provided on the partition plate attachment surface, the partition plate is pressed against the protrusion portion to be slightly warped when the partition plate is attached. In other words, the partition plate is forcibly pressed against the fan housing. For this reason, the partition plate and the fan housing are substantially integrated so that vibration and noise can be suppressed between the partition plate and the fan housing. Therefore, vibration-proof rubber can be removed.

According to the second aspect, the distal end of the protrusion portion is brought into surface contact with the partition plate. Accordingly, an effect to suppress vibration and a noise can be more stably obtained.

According to the third aspect, each of a plurality of the protrusion portions is pressed against the partition plate, thereby suppressing vibration and a noise more.

According to the fourth aspect, distances between the respective protrusion portions and the corresponding fixing portions are equal to each other, thereby suppressing vibration and a noise more.

According to the fifth aspect, an electric motor in which vibration and noise are suppressed can be provided.

In the above, the present invention is described by using the exemplary embodiments. However, a person skilled in the art will understand that the above-described modification, and various other modification, omission, and addition can be made without departing from the scope of the present invention.

What is claimed:

1. A fan unit comprising:
   a fan housing;
   a partition plate attachment surface located on the fan housing, the partition plate attachment surface having a plurality of connectors located equidistantly around the partition plate attachment surface;
   a fan motor provided in the fan housing;
   a partition plate attached to the partition plate attachment surface of the fan housing at the connectors, the partition plate regulates air flow from the fan motor, wherein the partition plate is substantially flat;
   a plurality of elongated protrusion portions provided on the partition plate attachment surface of the fan housing, wherein one of the plurality of protrusion portions is located about midway between each pair of the plurality of connectors, wherein each protrusion portion has a height and a length, the height being smaller than the length; and
   wherein the partition plate abuts each of the plurality of protrusion portions, and the partition plate is convexly warped outward in a fan motor axis direction away from the fan motor provided in the fan housing.

2. The fan unit according to claim 1, wherein a distal end of the protrusion portion contacting with the partition plate is a flat surface.

3. An electric motor comprising the fan unit according to claim 1.

4. An electric motor comprising the fan unit according to claim 2.

* * * * *